USOO5533616A

United States Patent [19]
Crowfoot

[11] Patent Number: 5,533,616
[45] Date of Patent: Jul. 9, 1996

[54] CASE FOR MOTOR BIKE

[76] Inventor: Catherine B. Crowfoot, Box 155, Preston, Md. 21655

[21] Appl. No.: 375,725

[22] Filed: Jan. 20, 1995

[51] Int. Cl.$^6$ .......................... B65D 81/18; B65D 85/68
[52] U.S. Cl. .................. 206/335; 52/69; 220/371; 220/665
[58] Field of Search ................ 206/45.34, 335, 206/373; 52/64, 66, 69, 79.4, 79.5; 220/371, 372, 665

[56] References Cited

U.S. PATENT DOCUMENTS

| 3,861,092 | 1/1975 | Dale et al. . | |
|---|---|---|---|
| 3,886,988 | 6/1975 | Garrett et al. | 206/335 |
| 3,945,159 | 3/1976 | Girnus, Sr. | 52/66 |
| 3,949,528 | 4/1976 | Hartger . | |
| 3,967,425 | 7/1976 | Wolverton et al. . | |
| 4,242,846 | 1/1981 | Hurd et al. | 52/64 |
| 4,255,911 | 3/1981 | Beacom et al. | 52/66 |
| 4,273,394 | 6/1981 | Chandler | 206/373 |
| 4,356,831 | 11/1982 | Adams . | |
| 4,506,786 | 3/1985 | Buchanan et al. . | |
| 4,792,039 | 12/1988 | Dayton | 206/335 |
| 4,991,715 | 2/1991 | Williams . | |
| 5,052,557 | 10/1991 | Contino et al. | 206/45.34 |

FOREIGN PATENT DOCUMENTS

| 33585 | 5/1964 | Finland | 52/66 |
|---|---|---|---|
| 3934946 | 4/1991 | Germany | 206/335 |

*Primary Examiner*—Jimmy G. Foster
*Attorney, Agent, or Firm*—Richard C. Litman

[57] ABSTRACT

A rugged case for a motorcycle including a base having apertures through which ground-borne anchors may be received to which the base or a vehicle may be secured. Two housings hinged at the base pivot in a vertical plane transverse to the length of the base to enclose the vehicle. The housings have vent holes to exhaust volatile fumes incident with internal combustion engine-driven vehicles. The housings, transparent or colored, loosely outline the contour of the vehicle without requiring disassembly. Wheels may be attached to the base to facilitate ready mobility of the case.

11 Claims, 2 Drawing Sheets

CASE FOR MOTOR BIKE

BACKGROUND OF THE INVENTION

1. Field of the Invention

The present invention relates to housing structures for vehicles. More specifically, the present invention relates to a portable housing for motorcycles or similarly-sized vehicles, which may be converted into a permanently-anchored structure.

2. Description of the Prior Art

Short- and long-term storage and protection from environmental and trespassory hazards is a common concern among owners of motorcycles. This is especially acute among owners of specialty or show motorcycles. Some specialty motorcycle owners may prefer stationary garage storage to shield the motorcycle from weather and trespassory hazards, such as vandalism. However, these owners may not always be able to attain proper protection for their motorcycles. These same owners also may need to transport their motorcycles and desire to do so with a device that protects the vehicle from travel grit, collisions or vandalism while traveling.

Clearly, a need exists for a device which provides physical protection yet is also portable. The device should also provide for quick and easy insertion into and removal therefrom of the vehicle.

Vehicle storage devices have been the subject of earlier patents. For example, U.S. Pat. No. 3,861,092, issued Jan. 21, 1975, to William L. Dale et al., describes a storage device including a hinged hood which pivots from the front of the base within a vertical rotational plane. The hood pivots up and out of the way to permit placing the vehicle on the base of the device. The hood may then be drawn over the top of the vehicle and locked down by means of a ring-and-hasp-type fastener.

U.S. Pat. No. 3,949,528, issued Apr. 13, 1976, to Richard W. Hartger, describes a storage device, similar to Dale's invention, including a hinged hood which also pivots from the front within a vertical rotational plane. In Hartger's invention, however, the pivot point is located at the top of the device. Hartger's invention also includes telescoping struts which maintain the pivoted hood in the opened position.

U.S. Pat. No. 3,967,425, issued Jul. 6, 1976, to Richard A. Wolverton et al., describes a storage device which has a trapezoidal shape in top plan view and has a pivoting closure. Wolverton's invention does not incorporate dual closures, nor does the closure disclosed pivot within a vertical plane.

U.S. Pat. No. 4,356,831, issued Nov. 2, 1982, to Laura A. Adams, describes a storage device including a pliable cover or bag which may be placed over a vehicle and tightened at the bottom with draw strings. Adams' invention is not a rigid structure, nor does it incorporate pivoting closures.

U.S. Pat. No. 4,506,786, issued Mar. 26, 1985, to Alvin E. Buchanan et al., describes a storage device including a rigid, I-shaped structure into which a vehicle may be disposed.

U.S. Pat. No. 4,991,715, issued Feb. 12, 1991, to Robert F. Williams, describes a storage device including dual closures which pivot within a vertical rotational plane transverse to the length of the vehicle stored therein. Williams' invention also includes wheels at the base to facilitate mobility thereof. However, Williams' invention suffers several shortcomings: First, Williams' invention fails to accommodate fully assembled vehicles. Second, Williams' invention does not have a cover which loosely follows the contour of the vehicle stored therein. Third, Williams' invention is not transparent. Fourth, Williams' invention has no apertures in the base for receiving ground-borne anchors. Fifth, Williams' invention has no vent holes to permit exhausting volatile fumes incident to vehicles including combustion engines. Sixth, Williams' invention is specifically intentioned for storage of a bicycle during transportation thereof, not permanent storage. Seventh, Williams' invention includes supports to accommodate a disassembled bicycle.

None of the above references, taken alone or in combination, are seen as teaching or suggesting the presently claimed motor bike case.

SUMMARY OF THE INVENTION

The present invention relates to a case for a motor vehicle, preferably for a motorcycle. The invention includes a base having apertures therethrough. Ground-borne anchors may be received through the apertures to which the base or vehicle may be secured. Wheels may be detachably mounted to the base to permit ready mobility of the case.

The invention further includes dual housings, hinged at the base, which pivot in a vertical plane transverse to the length of the base. The housings may be manufactured from any rugged material which may be transparent or imbued with various colors and/or designs. The housings have vent holes to permit exhausting volatile fumes incident to vehicles including internal combustion engines. These vent holes may include screens or filters to prevent unwanted intrusion of animals or debris.

The housings may be cooperatively held together by any number or type of fasteners, preferably a ring-and-hasp type fastener commonly found on storage lockers. Additionally, the fasteners may be locked to prevent unwanted intrusion.

In consideration of the above, an object of the invention is to provide a rugged, portable case for a motorcycle or similarly-sized vehicle which is, or permits the vehicle to be, readily securable to a foundation.

Another object of the invention is to provide a case for a motorcycle or similarly-sized vehicle which includes closures which articulate to the sides of the vehicle, thus permitting employment of the case in restrictive environments.

A further object of the invention is to provide a case for a motorcycle or similarly-sized vehicle which may be locked to resist intrusion either while secured to a foundation or while being transported.

Yet another object of the invention is to provide a case for a motorcycle or similarly-sized vehicle which is transparent and permits the user to display the vehicle, or which may be imbued with coloring and/or designs in an attractive manner.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
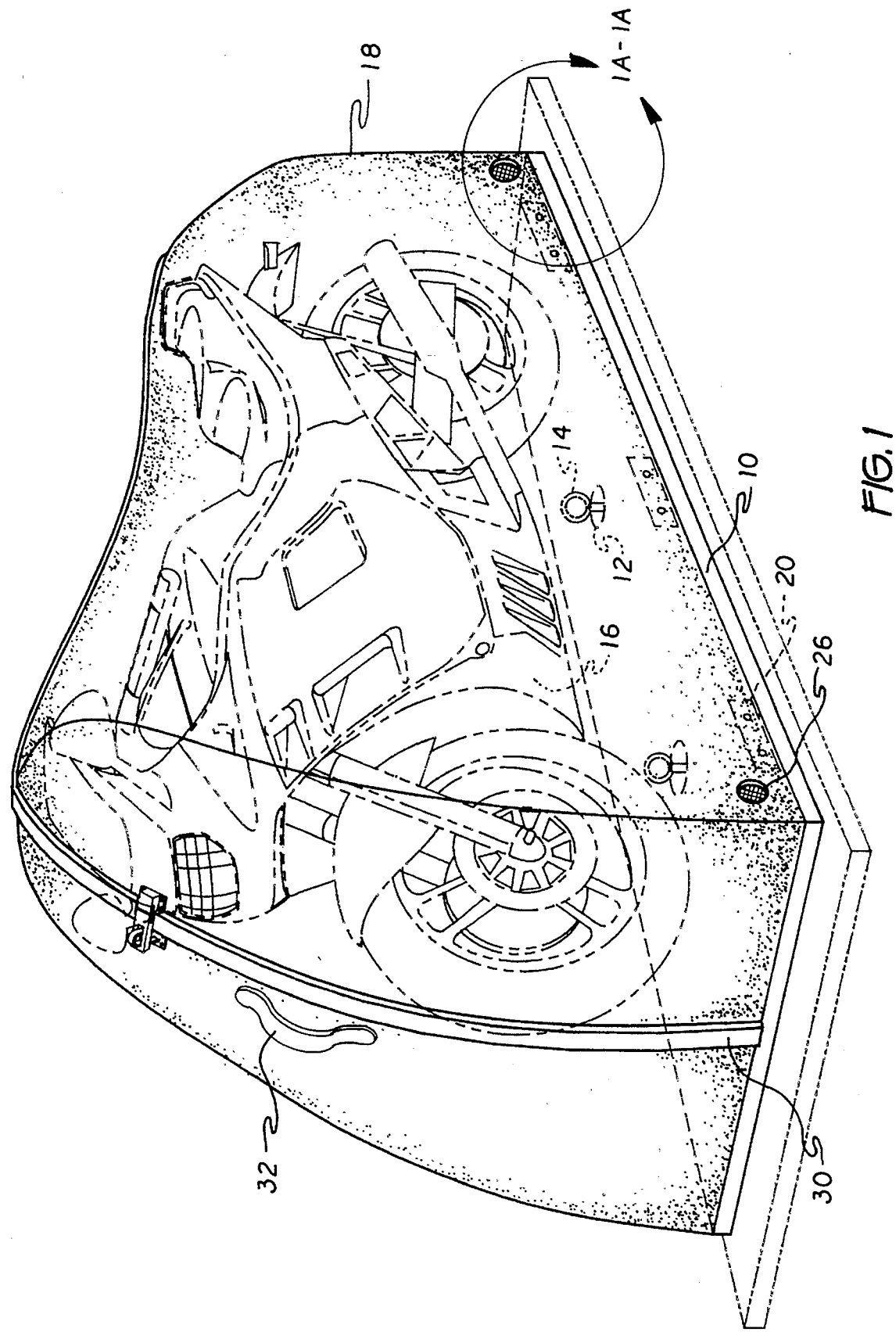
FIG. 1 is an environmental view of an embodiment of the invention on a foundation and encasing a motorcycle.

Referring to FIG. 1 the invention is shown including a base 10 having apertures 12. Ground-borne anchors 14 may be received through apertures 12 to which base 10 or a vehicle 16 may be secured. Apertures 12 may have covers (not shown) to seal the case from water or insects and animals when it is not firmly attached to the ground.

Figure 2:
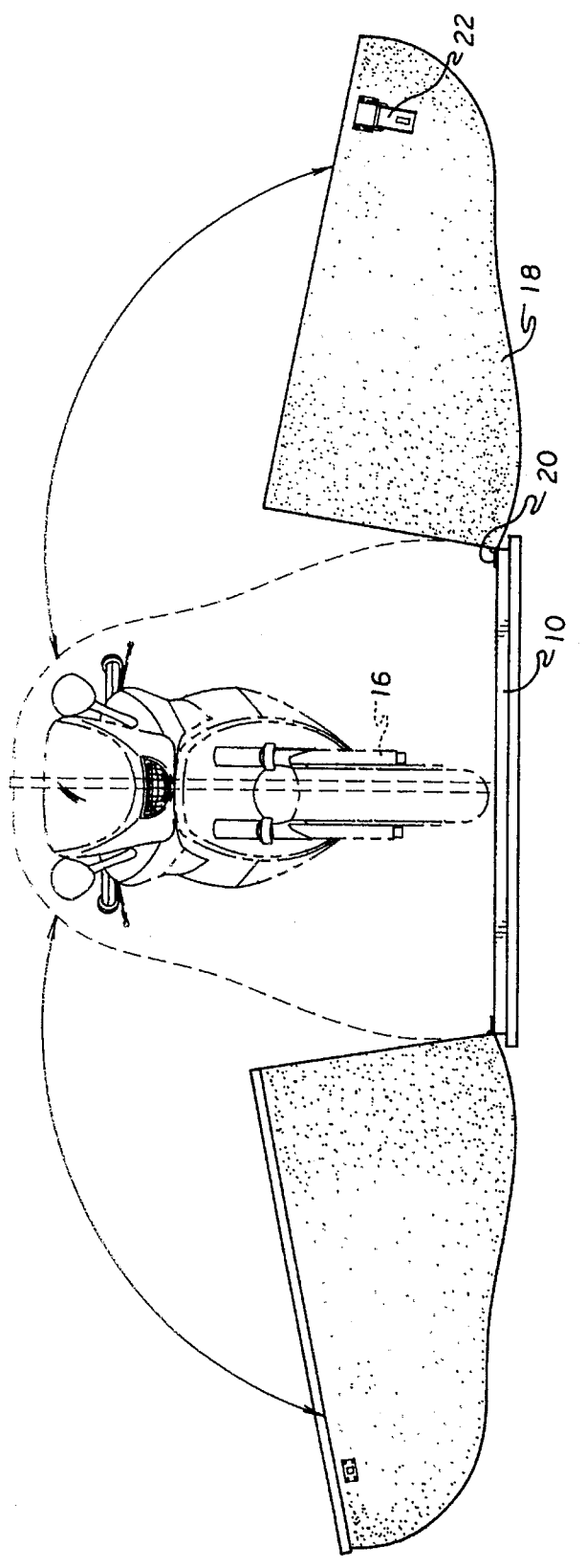
FIG. 2 is a front perspective view of an embodiment of the invention on a foundation with a motorcycle resting on the base and the housings articulated open.

Referring to FIG. 2, the invention further includes two housings 18 pivotally mounted to base 10 via hinges 20. When rotated into face-to-face abutment with each other, the housings 18 and base 10 define an enclosure for storage of a vehicle.

The housings 18 may be manufactured from rugged materials including, but not limited to: polyolefins, polystyrenes, copolymers containing the same; acrylonitrile/butadiene/styrenes copolymers, polyacrylates, polymethacrylates, phenolics or the like. Housings 18 may be transparent or have imbued in them various colors and/or designs. Closures 18 may include vent holes 26 to permit escape of volatile fumes incident to vehicles including internal combustion engines. Vent holes 26 may include screens or filters therein to prevent unwanted intrusion of animals or debris.

A singular handle 32 is shown to promote mobility of the case. Handle 32 may have a split-handle configuration to discourage distortion of the case which might otherwise be imparted if motive forces were concentrated on only one closure 18.

Hinges 20 are interposed between each closure 18 and base 10. All attachment points for the hinges 20 should be contained within the case to prevent tampering by would-be intruders. Housings 18 pivot in a vertical plane transverse to the length of base This arrangement permits using the invention in confined places, such as under stair cases.

Referring again to FIG. 1, housings 18 are shown cooperatively held together by, preferably, a ring-and-hasp type fastener 22, although any type of fastener may be employed. Fastener 22 may be locked with a lock (not shown) to prevent unwanted intrusion. Seals 30 provide for a watertight enclosure along the mating edges of base 10 and housings 18.

Figure 3:
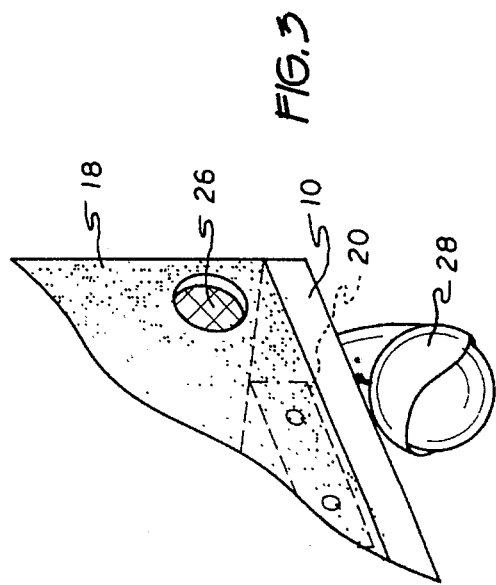
FIG. 3 is a section view within line 1A—1A showing a wheel attached to the base of the invention.

Referring to FIG. 3, the invention is shown including detachable wheels 28, which permit ready mobility of the invention while encasing vehicle 16.

The present invention is not limited to the sole embodiment described above, but encompasses any and all embodiments within the scope of the following claims.

I claim:

1. A case for encasing a motorcycle comprising:

a base;

a first housing having a peripheral edge;

a first hinge pivotally connecting said first housing to said base;

a second housing having a peripheral edge;

a second hinge pivotally connecting said second housing to said base;

said first and second housings having at least one vent hole with a filter disposed therein, said first and second housings movable between an opened and a closed position, wherein, when in said closed position, said first and said second housings abut one another along said peripheral edges, respectively, said first and second housings and said base defining an enclosed volume.

2. The case according to claim 1, wherein said base has at least one aperture.

3. The case according to claim 1, wherein at least one releasable fastener clasp is interposed between said first and said second housings, said releasable fastener being selected from the group consisting of a nut and bolt-type threaded fastener, an adjustable hook and eye-type fastener, a spring-loaded jaw fastener, a ring-and-hasp-type fastener, over-center latch-type fastener and a magnetic fastener.

4. The case according to claim 1, wherein said first and second housings are transparent.

5. The case according to claim 1, wherein a seal is interposed between said first and second housings along said peripheral edges, respectively.

6. The case according to claim 1, wherein a handle is disposed on one of said first and said second housings.

7. A case for encasing a motorcycle comprising:

a base;

a first housing having a peripheral edge;

a first hinge pivotally connecting said first housing to said base;

a second housing having a peripheral edge;

a second hinge pivotally connecting said second housing to said base;

said first and second housings having at least one vent hole with a filter disposed therein, said first and second housings being movable between an opened and a closed position, wherein, when in said closed position, said first and said second housings abut one another along said peripheral edges, respectively, said first and second housings and said base defining an enclosed volume;

said base having at least one aperture.

8. The case according to claim 7, wherein at least one releasable fastener clasp is interposed between said first and said second housings, said releasable fastener being selected from the group consisting of a nut and bolt-type threaded fastener, an adjustable hook and eye-type fastener, a spring-loaded jaw fastener, a ring-and-hasp-type fastener, over-center latch-type fastener and a magnetic fastener.

9. The case according to claim 7, wherein said first and second housings are transparent.

10. The case according to claim 7, wherein a seal is interposed between said first and second housings along said peripheral edges, respectively.

11. The case according to claim 7, wherein a handle is disposed on one of said first and said second housings.

* * * * *